Fig. 1.

Dec. 15, 1936. G. H. ZOUCK 2,064,138
MEANS FOR CONTROLLING MOTION OF A RAILWAY VEHICLE AXLE
Filed Nov. 4, 1933 8 Sheets-Sheet 2

INVENTOR
George H. Zouck
BY
ATTORNEYS

Dec. 15, 1936.   G. H. ZOUCK   2,064,138
MEANS FOR CONTROLLING MOTION OF A RAILWAY VEHICLE AXLE
Filed Nov. 4, 1933   8 Sheets-Sheet 3

INVENTOR
George H. Zouck
BY
ATTORNEYS

Dec. 15, 1936.   G. H. ZOUCK   2,064,138
MEANS FOR CONTROLLING MOTION OF A RAILWAY VEHICLE AXLE
Filed Nov. 4, 1933   8 Sheets-Sheet 4

INVENTOR
George H. Zouck
BY
ATTORNEYS

Dec. 15, 1936.  G. H. ZOUCK  2,064,138
MEANS FOR CONTROLLING MOTION OF A RAILWAY VEHICLE AXLE
Filed Nov. 4, 1933  8 Sheets-Sheet 5

INVENTOR
George H. Zouck
BY
ATTORNEYS

Dec. 15, 1936.    G. H. ZOUCK    2,064,138
MEANS FOR CONTROLLING MOTION OF A RAILWAY VEHICLE AXLE
Filed Nov. 4, 1933    8 Sheets-Sheet 6

Dec. 15, 1936.  G. H. ZOUCK  2,064,138
MEANS FOR CONTROLLING MOTION OF A RAILWAY VEHICLE AXLE
Filed Nov. 4, 1933  8 Sheets-Sheet 8

INVENTOR
George H. Zouck
BY
ATTORNEYS

Patented Dec. 15, 1936

2,064,138

UNITED STATES PATENT OFFICE 2,064,138

MEANS FOR CONTROLLING MOTION OF A RAILWAY VEHICLE AXLE

George H. Zouck, Orange, N. J., assignor to Franklin Railway Supply Company, New York, N. Y., a corporation of Delaware Application November 4, 1933, Serial No. 696,693

32 Claims. (Cl. 308—180)

This invention relates to railway vehicles and specifically to means for cushioning or controlling the relative movements which occur during service between the axle and the structure in which it is mounted. It is especially useful in cushioning or controlling what is known as lateral motion of the axle and is particularly applicable to vehicles which have long rigid wheel bases such, for example, as are found in modern high-power locomotives, but it is by no means to be limited thereto because most of the features of the invention are equally applicable to any railway vehicle.

Before stating the objects of or describing the invention in greater detail, it is desired to discuss somewhat briefly the problems which arise in caring for the relative movements between a railway vehicle axle and the structure in which it is mounted, which structure, of course, is a framework of some kind with respect to which the axle must have certain freedom of motion.

A railway vehicle axle and particularly a driving axle on a locomotive having a long rigid wheel base must have somewhat of a floating relation with respect to the vehicle which it helps to support. For example, in service, it must be possible for an axle to have what may be termed a vertical rocking motion with respect to the vehicle because it frequently happens, especially when rounding curves, that one end of the axle is slightly higher than the other. At such times also, if the speed is sufficiently great, the vehicle will tend to rock over toward the outside of the curve which, of course, serves to accentuate the angular displacement referred to. Furthermore, as between a series of axles in a rigid framework, there are, of course, conditions of service which necessitate one axle occupying a slightly higher position in the frame than does the succeeding axle or vice versa. In addition, lateral motion, i. e., motion of the axle with respect to the vehicle in a direction transverse of the vehicle, must be provided for, particularly in vehicles having long rigid wheel bases, for without some lateral motion it would be almost impossible to safely negotiate curves or cross-overs. All of these motions, of course, are familiar to those skilled in the art and they may be collectively referred to as "disalignments".

In connection with lateral motion it would, of course, at least from a theoretical standpoint, be ideal to provide a fixed distance between the wheel flanges on every axle and permit no lateral motion at all because a vehicle so equipped would run perfectly true on the track. This condition, however, is obviously impossible because it could be employed only with straight track and would make no adequate provision for negotiating curves or taking cross-overs, a problem which becomes particularly acute in vehicles having a long rigid wheel base.

In practice it is customary to provide a certain amount of clearance between the wheel flanges and the rails. In addition to this each axle is generally provided with a certain amount of "free" lateral; i. e., lateral motion of the axle with respect to the vehicle which is unrestrained or uncontrolled. Beyond this some locomotive driving axles are also provided with an additional amount of lateral motion which is positively controlled or resisted by various devices familiar to those skilled in the art. Indeed it has been found that with most vehicles and particularly with locomotives, after a vehicle has been placed in service it will nearly always gradually develop a certain degree of lateral motion through wear either of the hub faces or of the wheel flanges or both. This will occur even where some provision is made for lateral motion, and if no motion at all of this kind were provided it would very quickly develop, assuming, of course, that the vehicle could be safely operated in the meantime. When the wear exceeds a predetermined amount repair or replacement must be made in order to comply with the I. C. C. regulations.

However, in previous practice practically no effort has been made to provide controlled lateral motion except on the front driving axles of locomotives, and, as a usual thing, only upon locomotives having at least four driving axles, although some designs have been made for applying controlled lateral to the forward axle of a three-axle locomotive. In addition to this, there are instances where controlled lateral has been applied to the rear axle of a locomotive but these are relatively few. Occasionally, in three axle engines the wheels of the center axle have equipped with what are known as "blind tires", i. e., tires without flanges, so that the axle so equipped is free to walk across the top of the rail. As a usual thing, however, blind tires are not applied to locomotives having less than five pairs of wheels and in this case they are normally applied to the drivers on #3 axle. In installations of this kind it is, of course, obvious that a very great deal of punishment must be absorbed by the wheels of the front axle alone, since this is generally the only place where controlled lateral is applied.

With all of the foregoing in mind, the present invention will be better understood and its chief object may be said to consist in providing means for cushioning or controlling the various "disaligning" motions of the axle with respect to the vehicle incident to the movement of the vehicle over the track and it is particularly adapted for cushioning or controlling the lateral motion of an axle such as occurs when the vehicle is rounding curves or taking cross-overs or during what is known as lateral "nosing" thereof. In its broader aspects the invention is designed to provide a cushioning or controlling means of the character described which is applicable to any axle on any vehicle, especially to any axle in which it is either desirable or necessary to provide for controlled lateral motion, a feature which was not possible with any of the constructions heretofore known to the art insofar as I am aware.

A further object of the invention is to provide means for cushioning or controlling the motion of the axle which reacts through the bearings for the axle instead of through the axle boxes as is customary in present practice. In other words, the present invention involves the provision of axle boxes which are fixed with respect to the vehicle frame in a direction transversely of the vehicle, together with means for permitting the axle bearings to move with the axle within the boxes and cushioning such motion by means which reacts through the bearings.

It is also an object to provide a lateral motion device in which it is possible to keep the load central over the bearing in spite of the fact that the bearing moves with the axle.

Another object of the invention is to provide anti-friction bearings for the axle and to cushion or control the motion of such bearings by means which reacts through one of the bearing races, preferably the outer race, as will appear hereinafter, and, as a very important part of this object, my invention also contemplates the provision of means whereby any of the well known types of anti-friction bearings may be employed.

A further object of the invention is to provide a device of the character described in which the motion of the bearing is yieldingly resisted by means which are carried by the axle box. Such a means, as will appear, takes the form preferably of a spring held plunger mechanism the structure of which becomes an integral part of the box, or at least a part which is fixed thereto and moves therewith in any up and down motion which the box may have with respect to the vehicle frame.

By my invention I have also made it possible to provide for the application of means for controlling lateral motion which can be designed to exactly meet the degree of force required at each individual axle or to vary the degree of resistance exerted at the beginning and at the end of the motion as may be desirable. For instance, by my invention it is possible to employ a certain amount of resistance when lateral motion first takes place in any given axle and to increase the resistance toward the end of the movement in order to better cushion the action and more effectively control the lateral. This can be accomplished, for example, as will appear more clearly hereinafter, by the adoption of a series of spring held plungers of different lengths or by the use of springs of different strengths or by the employment of springs which come into play successively so as to add to the initial resistance, or by any combination of the foregoing. On the other hand, if an increase in resistance is not desired, the parts may be so designed and arranged as to employ an almost constant resistance where operating conditions make such a condition useful or advantageous.

In connection with all of the foregoing, it is the object of my invention to greatly reduce shocks due to lateral motion and to minimize wear. Indeed, with my improvements it is possible to entirely eliminate wear at the hub faces for the reason that it is not necessary to have the hub faces contact with the boxes. Furthermore, whatever wear occurs at other points, such as between the wheel flanges and the rails, will be greatly reduced.

The accompanying drawings illustrate preferred embodiments of the invention and show it as applied to locomotives, but I wish it to be understood that the invention is not necessarily limited to locomotives alone, as it may be employed equally well upon any other vehicle in which it is either desirable or necessary to control or cushion the lateral motion. Indeed, by adopting my invention throughout all the cars of a train it is possible to greatly improve the riding qualities of every one of the vehicles of which it is composed and at the same time to minimize the degree of wear which will develop either in the vehicles themselves or in the track and road bed.

In the drawings:—

Figure 10 is a view similar to Figures 4 and 6 but illustrating a still further modification in which a backing shoe is provided between the outer race and the adjacent walls of the axle box, and taken approximately as indicated by the line 10—10 on Figure 11.

Figure 12 is a section taken on the line 12—12 of Figure 11.

Referring to the embodiment of the invention which is illustrated in Figures 1 to 5 inclusive, it will be seen that the axle 13 is provided with a pair of shoulders 14 between which and the wheels 15 at each side is located an axle box 16 which, in this instance, is a driving box inasmuch as the axle 13 is a driving axle of a locomotive. The wheel flanges are shown at 17 and the rails at 18, with the road bed roughly indicated at 19.

The vehicle frame 20 is provided with pedestal jaws 21 (see Figure 3) which are embraced by the flanges 22 of the box 16. The opposed faces of the jaws 21 are fitted with the shoes 23 and the flanges 22 are provided with suitable wear plates 23a and it will be seen that the meeting faces of the shoes and the wear plates are perfectly flat, with just sufficient clearance to permit the necessary vertical motion of the box but with no provision for lateral motion in a direction transversely of the vehicle. In other words, the boxes 16 are fixed with respect to the frame 20 in a direction transverse of the vehicle or longitudinally of the axle. This is just the opposite of present practice where the flanges on the boxes are arranged so as to permit lateral motion to take place between the box and the frame.

The load is transmitted to the tops of the boxes through the saddles 24 which straddle the frame members 20.

Within each box is mounted a roller bearing, the type illustrated being known as the self aligning type because of the fact that certain rocking movements of the axle are taken care of by virtue of the rounded or barrel formation of the rollers and the corresponding curvature of the outer race. These bearings include an inner race 25 which may be shrunk upon the axle 13 in order to rotate and move therewith and an outer race 26 between which are two rings of barrel-shaped rollers 27 with the rollers of the two rings inclined in opposite directions as shown in the drawings. This, of course, is a well known type of roller bearing and I make no claim to the bearing per se, particularly since other types of bearings may be used with my invention as will appear more fully hereinafter. A spacing ring or collar 28 having a laterally extending protecting shoulder 29 is fitted between the axle shoulder 14 and the inner face of the inner race 25 and another spacing ring 30 is fitted between the hub face 31 of the wheel and the outer face of the inner race 25. Oil retaining rings 32 are mounted between the inner race and the collars 28 and 30, the rings 32 cooperating with the annular channels 33 in the box in order to prevent loss of lubricant.

In the upper portion of the box a suitable wear strip 34 is inserted between the periphery of the outer race and the inner face of the top of the box. At the bottom there is a slight clearance, as indicated at 36, between the bottom 16a of the box and the outer race. It should be noted that the bottom 16a of the box is in the form of a cellar which can be dropped down away from the axle upon removal of the wedges 37, the cellar being provided with the flanges 38 which lap over the flanges 22, which latter extend down from the top portion of the box in position to embrace the bottom 16a as clearly shown in Figure 2.

Figure 1:
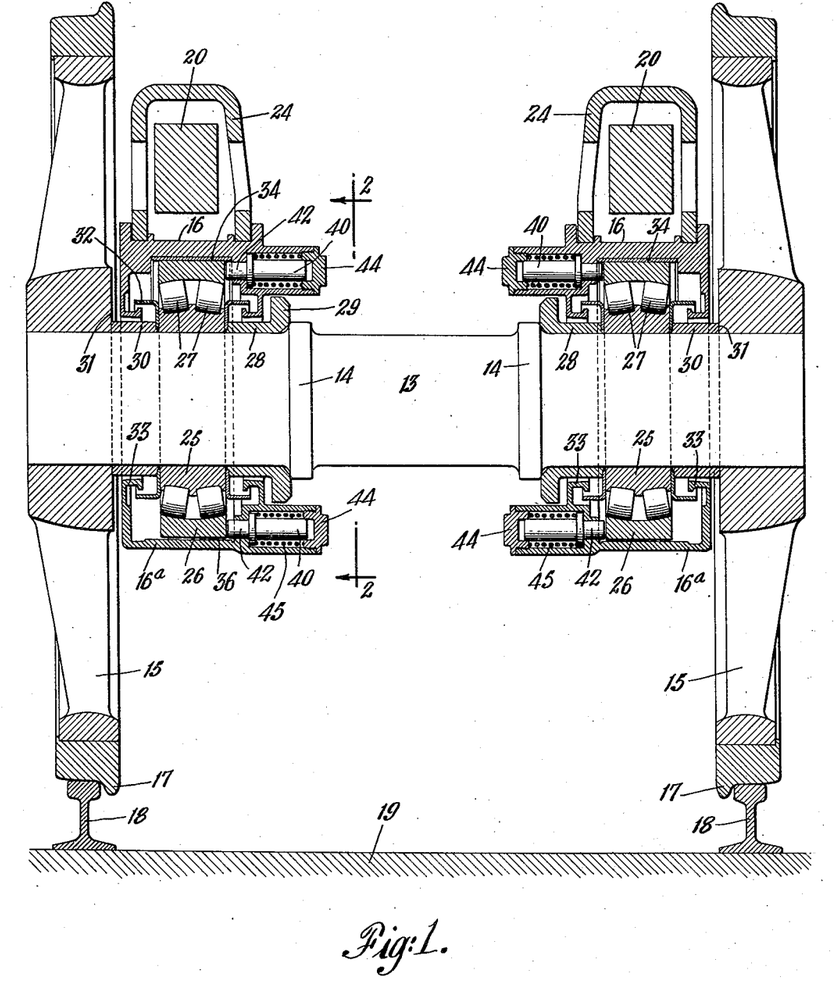
Figure 1 is a vertical section taken longitudinally of a locomotive axle illustrating one form of my invention applied thereto.
Figure 2:
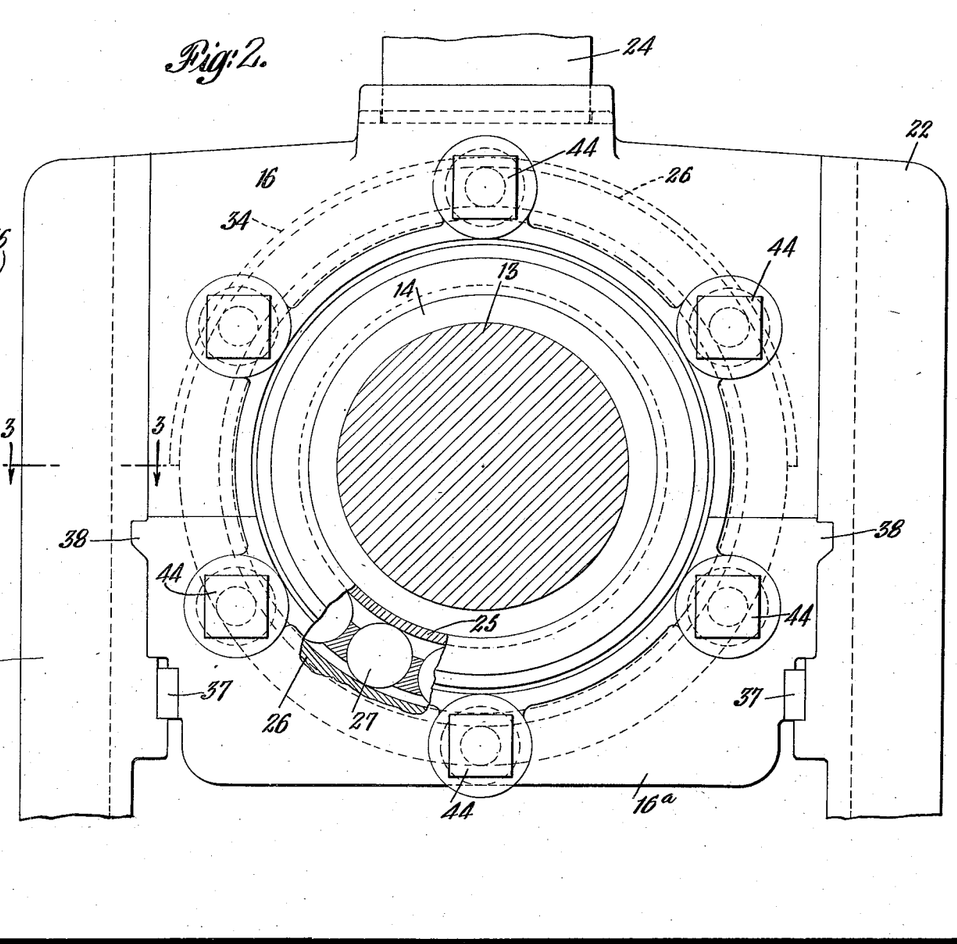
Figure 2 is an elevation on an enlarged scale taken approximately as indicated by the line 2—2 in Figure 1 with a small portion broken away to show certain details in section.
Figure 3:
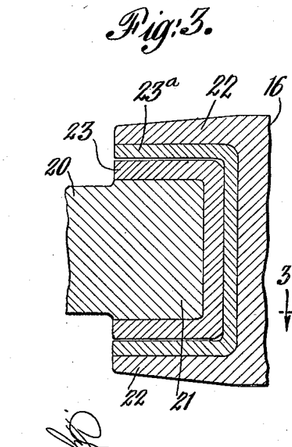
Figure 3 is a section on the line 3—3 of Figure 2.
Figures 4, 5, 5A:
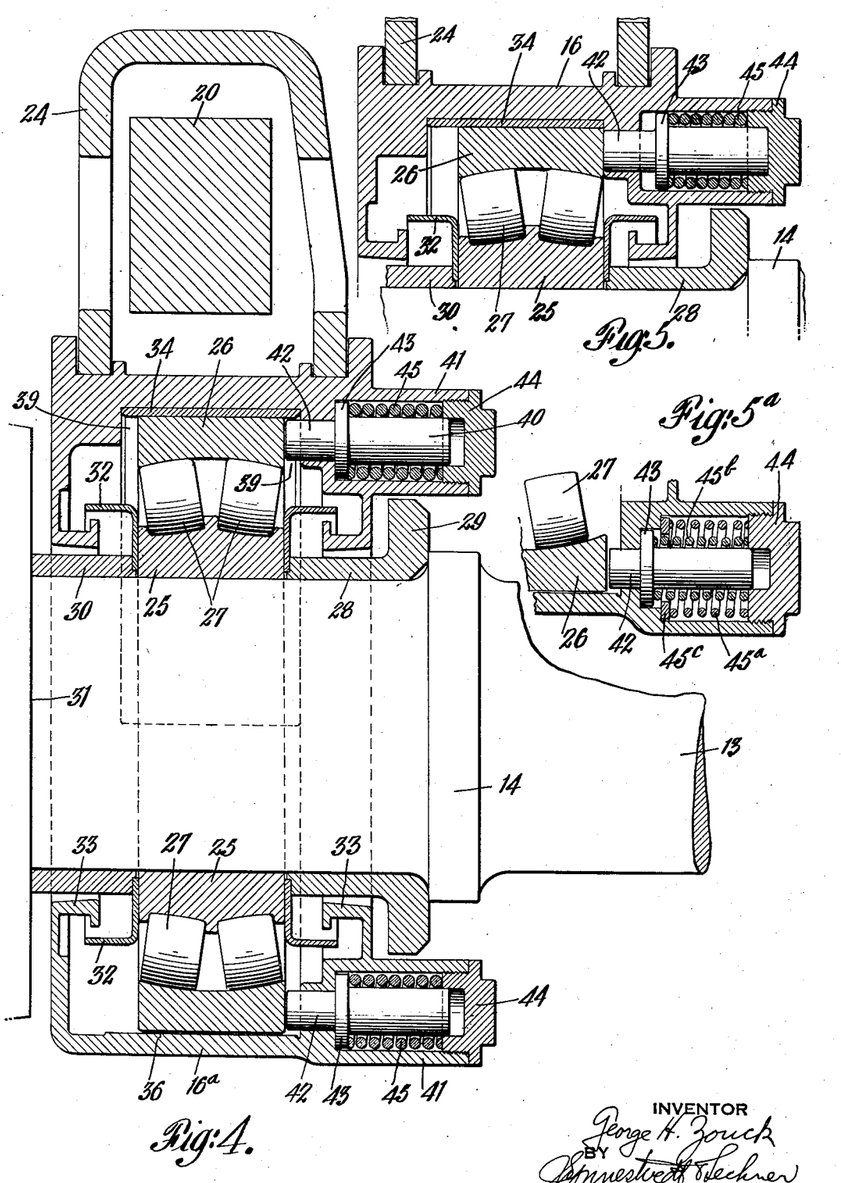
Figure 4 is a part section similar to that of Figure 1 but on a greatly enlarged scale in order to more clearly illustrate the details of the arrangement.
Figure 5 is a fragmentary sectional view similar to Figure 4 illustrating the parts in their extreme position of lateral motion.
Figure 5a is a fragmentary sectional view illustrating an arrangement wherein more than one spring is employed around a resistance plunger.
Figure 6:
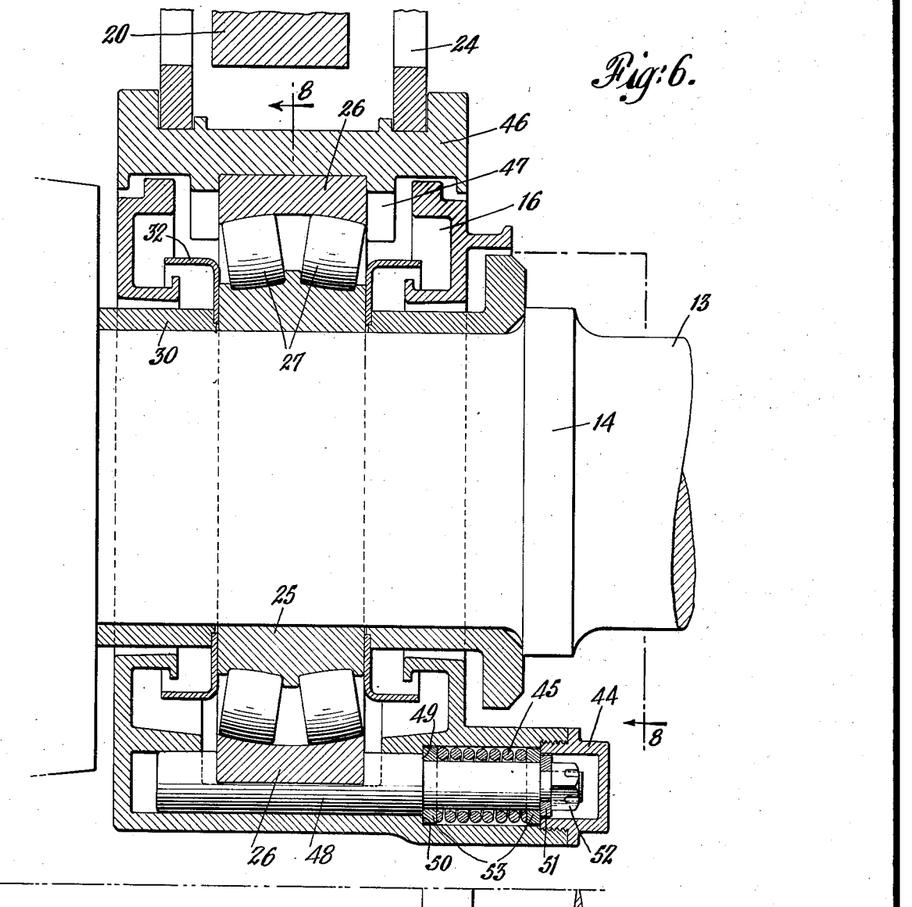
Figure 6 is a view similar to Figure 4 illustrating a modification of the invention wherein the load is kept central over the bearing as the bearing moves with the axle, and wherein a slightly different arrangement of yielding resistance means is employed from that which is shown in Figures 1 to 5.

By referring particularly to Figures 4 and 5 it will be seen that the overall dimension of the bearing transversely of the vehicle is considerably less than the distance between the opposing inside faces of the box, so that, as shown in Figure 4, a substantial clearance 39 is provided at each side of the bearing when the latter is in mid position. This clearance is made sufficiently great to take care of the degree of lateral motion which may be desired for the particular axle in question, it being understood, of course, that as the axle 13 moves laterally of the vehicle the bearing as a whole will move with it either to one side or the other of the box, depending upon the condition existing at the moment. In Figure 5 the parts are shown in the positions they would occupy after the axle has moved to its extreme position at the right. In this position the bearing lies against the inner face of the inside wall of the box. Movement in the opposite direction will bring the bearing up against the inner face of the outside wall of the box. It will be understood, of course, that the self aligning type of bearing illustrated takes care of both radial and thrust loads as well as of rocking movements of the axle.

Resistance to the lateral motion is supplied by the annular series of spring pressed plungers 40 which are carried in pockets 41 projecting laterally from the inside wall of the box. Suitable apertures are provided in the walls so that the reduced ends 42 of the plungers may project therethrough into the path of movement of the outer race 26. In neutral position, which, of course, will generally exist when the vehicle is traveling along straight track, the ends 42 will be just about in engagement with the inner face of the race as shown in Figure 4, the race at this time lying substantially mid-way between the box sides with practically the same amount of clearance 39 at each side thereof.

The plungers are provided with shoulders 43 between which and the heads 44 lie the compression springs 45. The heads may be screw threaded into position as shown, or they may be secured in any other desired manner. Preferably, however, some means for adjustment should be provided so that the pressure on the spring can be varied if desired. When lateral motion occurs the plunger will be forced inwardly and the spring compressed as shown in Figure 5. It will be understood that during motion of the axle and bearing in the opposite direction the springs on the other side will provide the necessary resistance. In other words, the mechanism for resisting the lateral motion shown in Figures 1 to 5 inclusive may be described as being "single acting".

It will be seen that the structure provides resistance which is, as it were, locked up until such time as it is needed. Therefore, the resisting means is in no way subjected to wear or strain except during periods when it is brought into play.

I should like to call attention to the fact that as between the several axles of any given vehicle it is entirely feasible to alter the degree of resistance at each axle. This may be done in a number of ways, as, for example, by varying the pressure on the springs, by substituting springs of different strength or by altering the length of the plungers so that they will come into operation at different moments. In this way just exactly the proper degree of resistance to lateral motion can be supplied for each axle. Furthermore, a plurality of springs might be employed which come into play successively so that resistance to lateral motion can be very definitely increased toward the end of the movement. One embodiment of such an arrangement is illustrated in Figure 5a wherein a pair of springs 45a and 45b are employed instead of a single spring 45 as shown in the other figures. The outer of these two springs, i. e., the spring 45a, is of shorter length than the inner spring 45b so that it will not come into play until after the plunger 40 has completed a portion of its stroke. The outer spring reacts between the washer 45c and the head 44 and the shoulder 43 does not come into contact with the washer until after the inside spring has been somewhat compressed. In an arrangement of this kind the springs might be of different strengths if that seemed desirable.

In Figures 1 to 4 inclusive I have shown the use of six spring held plungers, although I wish it to be understood that the number of the plungers can be varied to suit individual requirements.

In the modification of Figures 6 to 9 inclusive the box 16 is provided with an open top into which projects a separate load transmitting member 46. This member rests upon the outer race 26 and moves therewith by virtue of its flanges 47 which embrace the sides of the race. It receives the load on its upper surfaces through the medium of the saddle 24 which straddles the frame 20 as in Figures 1 to 5. By this arrangement the load is kept central over the bearing regardless of the degree of lateral motion, which is not true of the arrangement in Figures 1 to 5.

Figure 7:
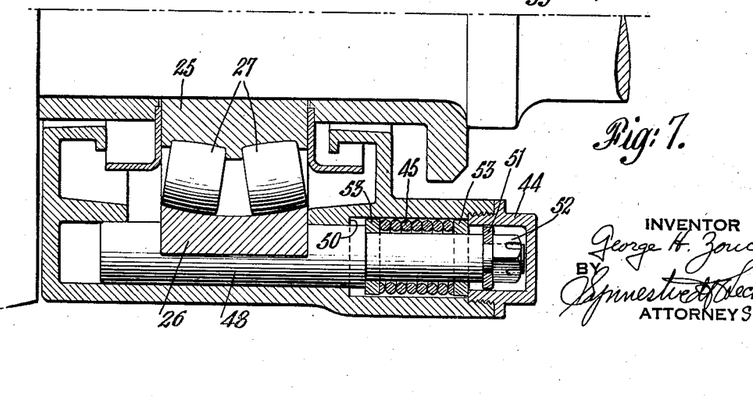
Figure 7 is a fragmentary view similar to Figure 6 but showing the parts in their extreme position of lateral motion.
Figure 8:
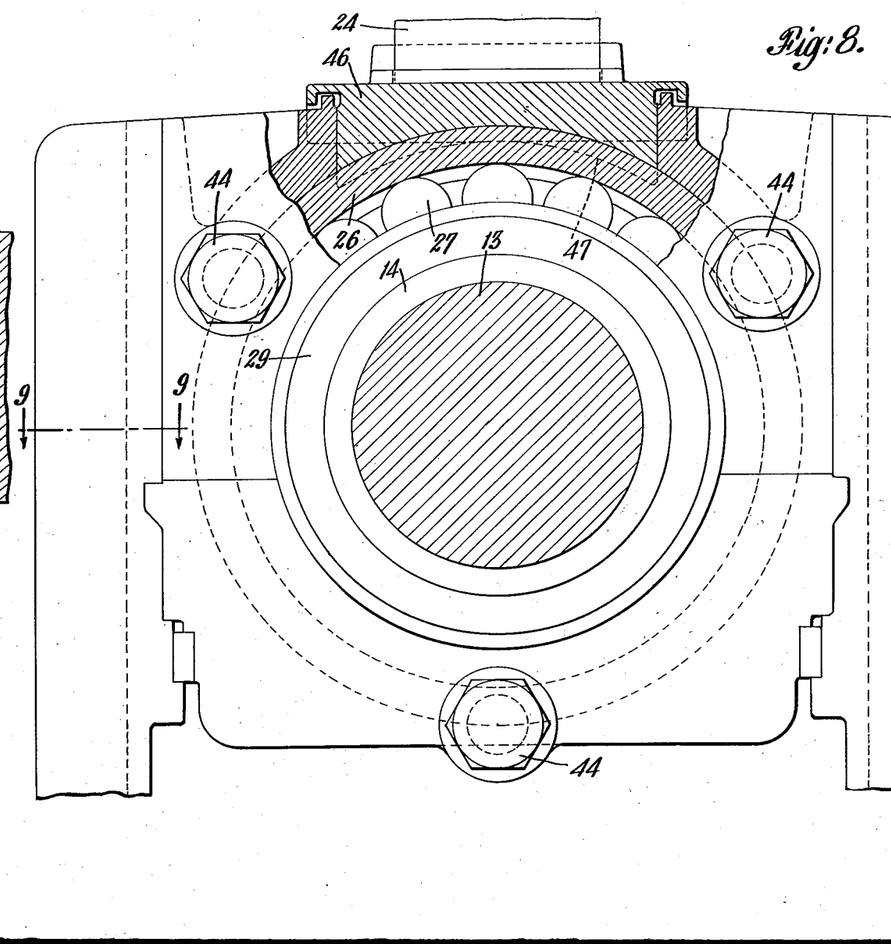
Figure 8 is a section taken approximately on the line 8—8 of Figure 6.
Figure 9:
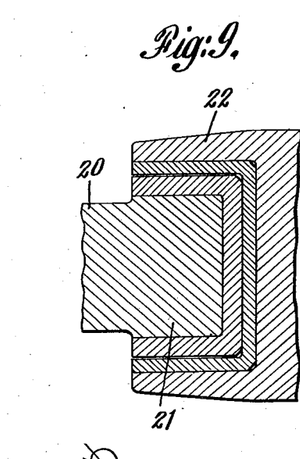
Figure 9 is a section taken on the line 9—9 of Figure 8.

Figures 6 to 9 inclusive also illustrate a modified form of resistance means which may be described as double acting in contradistinction to single acting, inasmuch as the power of the springs 45 is, in this arrangement, brought into play during lateral movements of the axle in either direction. In the device of these figures the plungers are replaced by bolts the inner ends 48 of which are of yoke shape in order to embrace the outer race, so that the bolt will be carried in either direction as the bearing moves with the axle. The spring 45 reacts between the shoulder 49 on the bolt and the head 44 when lateral motion takes place in one direction (i. e., to the right as shown in Figure 7) and between the shoulder 50 on the box and the washer 51 and nut 52 on the bolt when motion takes place in the opposite direction, i. e., to the left. There is a washer 53 at each end of the spring, which washers act as seat members for the spring during functioning of the device.

Where this double acting mechanism is used the number of individual resisting devices would be substantially reduced because all of the springs at both ends of each axle will take part in resisting lateral motion.

In other respects the structure of Figures 6 to 9 inclusive is essentially the same as that illustrated in Figures 1 to 5 inclusive, the broad principle of the invention being equally present in both arrangements.

Figure 11:
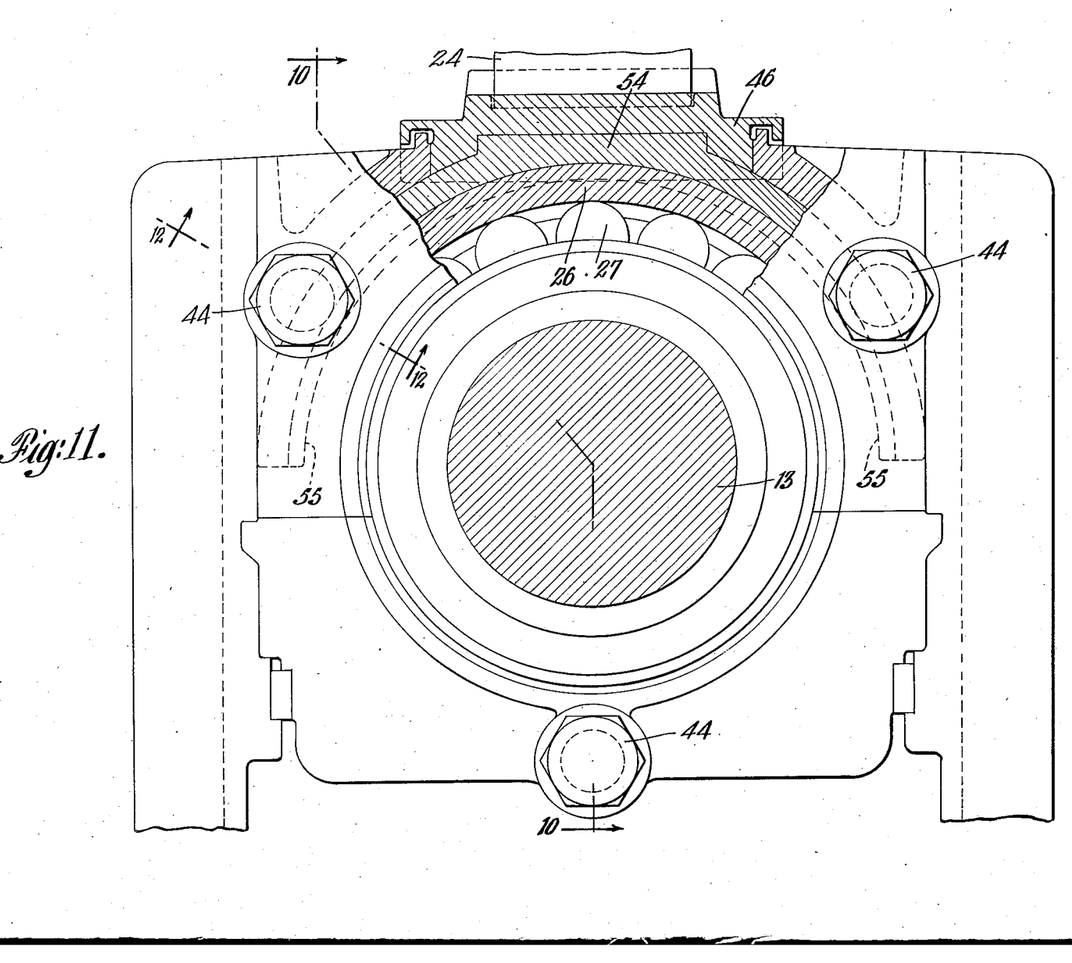
Figure 11 is a section taken approximately on the line 11—11 of Figure 10.

In the modification of Figures 10 to 12 inclusive the outer race is provided with a backing shoe 54 which extends substantially half-way around the race as clearly shown in the figures. This shoe has side flanges 55 which embrace the race so that it moves therewith. The shoe, if desired, could be made to extend either farther or less far around the race, the idea being to relieve the race as much as possible of direct strain incident to the functioning of the mechanism. In this arrangement sliding motion takes place between the backing member or shoe 54 and the inner surface of the top of the box instead of between the outer race 26 and the box, which, of course, is another advantage incident to the use of the shoe because it relieves the race of any stresses which may be incident to such sliding motion.

The resistance device illustrated in these figures is the same as that shown in Figures 6 to 9 inclusive, i. e., the double acting arrangement with three bolts, one at the bottom and two near the top, one at each side of the box as shown to best advantage in Figure 11. The resistance device at the bottom, of course, will react directly through the race itself as already described in connection with Figures 6 to 9, whereas the two devices at the top will react through the backing shoe 54 as shown in Figure 12, the structure and operation, however, being just the same in Figure 12 as it is in the other figures, except, of course, that the yoke-shaped end of the bolt on the two upper devices embraces the backing member 54 instead of the outer race 26. The structure of Figures 10 to 12 also makes use of the separate load transmitting shoe 46 shown in Figures 6 to 8, although here it is obvious that this member must rest upon the backing shoe 54 instead of upon the race. The load transmitting member, the backing shoe and the race all move together with the bearing and the axle during lateral motion so that the load which is delivered through the saddle 24 is maintained central of the bearing regardless of the degree of lateral motion.

Figure 13:
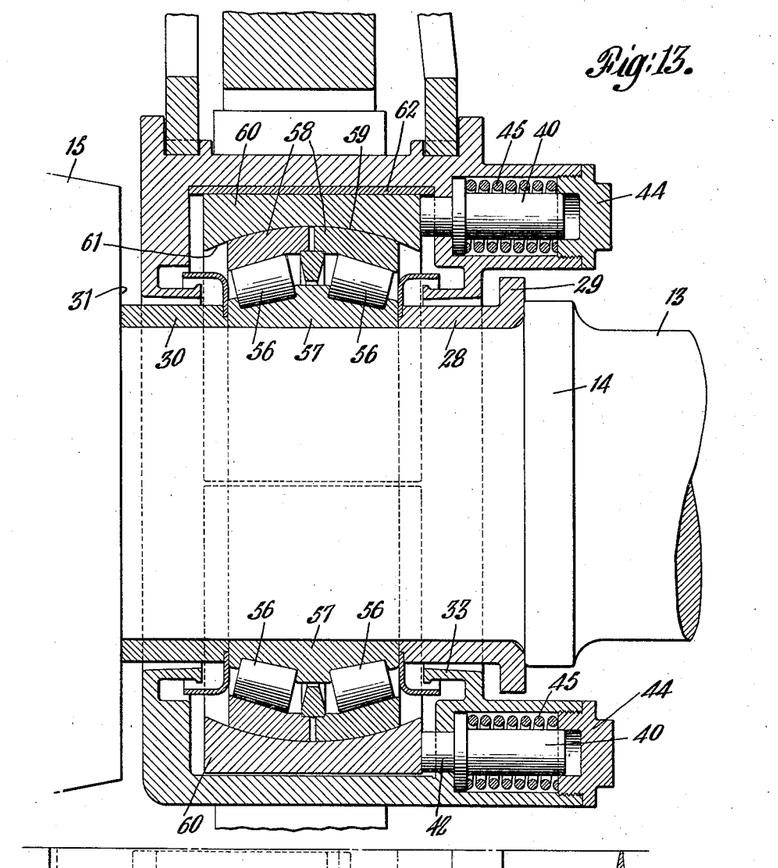
Figure 13 is a view similar to Figures 4, 6 and 10 but illustrating certain modifications of the invention as applied to a roller bearing of a different type than that which is illustrated in the other figures of the case.
Figure 14:
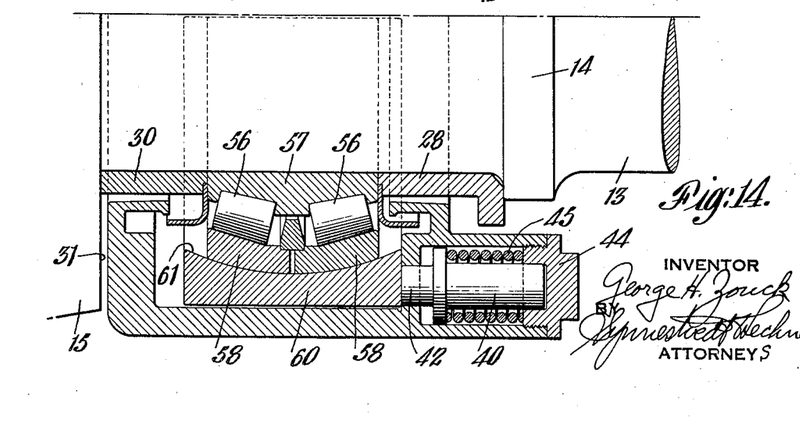
Figure 14 is a partial section similar to Figure 13 but showing the parts in the positions they will occupy in one extreme of lateral motion.

In Figures 13 and 14 I have illustrated my invention as applied to an anti-friction bearing of a type which is different from the type shown in the previous figures. Instead of the barrel-shaped rollers of the earlier figures the construction of the present figures employs two rings of tapered rollers 56, the rollers of each ring being oppositely inclined and having their ends of greater diameter adjacent to each other as clearly shown in the figures. The inner race 57, of course, is secured to the axle 13 in order to move therewith. The outer race is composed of two parts 58 which are formed to present a substantially continuous curved outer face 59 struck from a point in the center of the axle in order to take care of rocking movements of the axle. A backing shoe 60 having a correspondingly curved inner surface 61 surrounds the outer race. The backing member is made in two halves, an upper half and a lower half, and between the top of the outer half and the inner face of the top of the box is located a wear plate 62.

This type of bearing also is designed to take care of thrust loads as well as radial loads, and by virtue of the particular configuration of the outer race and of the backing shoe into which it fits, this bearing will also take care of the necessary rocking movements of the axle. The bearing, as a whole, together with the backing member, moves with the axle during lateral motion and the cushioning resistance plungers 40 react against the backing member 60. The plungers 40 and the parts associated therewith are substantially the same as those which are illustrated in Figures 1 to 5 inclusive, so that no further description of them is thought to be necessary. Figure 13 shows the structure in mid-position and Figure 14 in the extreme position of lateral motion in one direction, i. e., with the axle to the right with respect to the box.

It will be seen that in its broader aspects I have provided for cushioning or resisting the movements of a railway vehicle axle by means of a construction whereby the bearing moves with the axle in relation to the box, which latter is fixed with respect to the frame, except, of course, for the necessary up and down movement in the pedestal jaws. Furthermore, resistance to lateral motion has been provided for by means of structure which is carried by the box itself, the reaction taking place between the box, which is fixed with respect to the frame, as described, and the bearing which moves therein.

My improvements make possible a flange clearance which is the same at all axles. In other words, in railway vehicles having a long rigid wheel base, such as is found in modern high power locomotives, it is not necessary to provide different amounts of flange clearance as is customary in present practice. This is a very important featuure of the invention inasmuch as it makes for smoother riding qualities and more evenly distributes the wear between the wheels of the several axles.

The invention is simple, efficient and moderate in cost and of wide adaptability, so that it can be applied to any axle of any railway vehicle in a way which will meet all demands and conditions. The degree of resistance may be quickly and easily varied as between the several axles of any one vehicle, so that the smoothest possible running conditions may result with wear either entirely eliminated or greatly reduced and much more evenly distributed than is possible with any of the structures heretofore known to the art.

I claim:—

1. A device for controlling motion of a railway vehicle axle including in combination with the frame of the vehicle, an axle box mounted in the frame so as to have freedom for vertical movement but restrained against transverse movement with respect thereto, an axle bearing in said box mounted to move within the box with the axle, and spring held plunger means projecting through the box and adapted to yieldingly resist motion of said bearing.

2. A device for controlling motion of a railway vehicle axle including in combination with the frame of the vehicle, an axle box mounted in the frame so as to have freedom for vertical movement but restrained against transverse movement with respect thereto, an anti-friction bearing for the axle having an inner and an outer race, said bearing being mounted to move within the box with the axle, and spring held plunger means projecting through the box and adapted to react against the outer race to yieldingly resist motion of the bearing and the axle.

3. A device for controlling motion of a railway vehicle axle including in combination with the frame of the vehicle, an axle box mounted in the frame so as to have freedom for vertical movement but restrained against transverse movement with respect thereto, an anti-friction bearing for the axle, said bearing having an inner and an outer race one of which races moves within the box with the axle, and spring held plunger means projecting through the box and adapted to react against said movable race to yieldingly resist motion thereof.

4. A device for controlling motion of a railway vehicle axle including in combination with the frame of the vehicle, an open topped axle box mounted in the frame, an axle bearing in said box mounted to move within the box with the axle, a load transmitting member mounted within said open top upon said bearing and adapted to move with the bearing, and means for yieldingly resisting such motion.

5. A device for controlling motion of a railway vehicle axle including in combination with the frame of the vehicle, an open topped axle box mounted in the frame, an axle bearing in said box mounted to move within the box with the axle, a load transmitting member mounted within said open top upon said bearing and adapted to move with the bearing, and means reacting against the box for yieldingly resisting such motion.

6. A device for controlling motion of a railway vehicle axle including in combination with the frame of the vehicle, an open topped axle box mounted in the frame, an axle bearing in said box mounted to move within the box with the axle, a load transmitting member mounted within said open top upon said bearing and adapted to move with the bearing, and spring means carried by the box for yieldingly resisting such motion.

7. A lateral motion device for a railway vehicle axle including in combination with the frame of the vehicle, an open topped axle box mounted in the frame, an axle bearing in said box mounted to move within the box with the axle transversely of the vehicle, and a load transmitting member mounted within said open top upon said bearing and adapted to move with the bearing.

8. A device for controlling motion of a railway vehicle axle including in combination with the frame of the vehicle, an open topped axle box mounted in the frame, an anti-friction bearing for the axle having an outer race, said bearing mounted to move within the box with the axle, a backing shoe between the outer race and the box adapted to move with the bearing, a load transmitting member mounted within said open top upon said backing shoe and adapted to move with said shoe, and means for yieldingly resisting such motion.

9. A device for controlling motion of a railway vehicle axle including in combination with the frame of the vehicle, an open topped axle box mounted in the frame, an anti-friction bearing for the axle having an outer race, said bearing mounted to move within the box with the axle, a backing shoe between the outer race and the box adapted to move with the bearing, a load transmitting member mounted within said open top upon said backing shoe and adapted to move with said shoe, and means reacting against the box for yieldingly resisting such motion.

10. A device for controlling motion of a railway vehicle axle including in combination with the frame of the vehicle, an open topped axle box mounted in the frame, an anti-friction bearing for the axle having an outer race, said bearing mounted to move within the box with the axle, a backing shoe between the outer race and the box adapted to move with the bearing, a load transmitting member mounted within said open top upon said backing shoe and adapted to move with said shoe, and spring means carried by the box for yieldingly resisting such motion.

11. The device of claim 8 wherein the yielding resistance operates through the backing member.

12. The device of claim 9 wherein the yielding resistance operates through the backing member.

13. The device of claim 10 wherein the yielding resistance operates through the backing member.

14. A device for controlling motion of a railway vehicle axle including in combination with the frame of the vehicle, an open topped axle box mounted in the frame, an axle bearing in said box mounted to move within the box with the axle, load transmitting means projecting through said open top and resting upon and adapted to move with the bearing, and means for yieldingly resisting such motion.

15. A device for controlling motion of a railway vehicle axle including in combination with the frame of the vehicle, an open topped axle box mounted in the frame, an axle bearing in said box mounted to move within the box with the axle, load transmitting means projecting through said open top and resting upon and adapted to move with the bearing, and means reacting against the box for yieldingly resisting such motion.

16. A device for controlling motion of a railway vehicle axle including in combination with the frame of the vehicle, an open topped axle box mounted in the frame, an axle bearing in said box mounted to move within the box with the axle, load transmitting means projecting through said open top and resting upon and adapted to move with the bearing, and spring means carried by the box for yieldingly resisting such motion.

17. A lateral motion device for a railway vehicle axle comprising in combination, a vehicle frame, an axle box mounted in the frame so as to be restrained against relative movement between the frame and the box in a direction transverse of the vehicle, an axle bearing in the box mounted to move within the box with the axle during relative lateral movement between the axle and the frame and normally inoperative means for yieldingly resisting lateral movement, said means being adapted to act through the bearing in offering its resistance and to urge the axle to resume its normal position after cessation of the forces which caused the lateral motion.

18. A lateral motion device for a railway vehicle axle comprising in combination, a vehicle frame, an axle box mounted in the frame so as to be restrained against relative movement between the frame and the box in a direction transverse of the vehicle, an axle bearing in the box mounted to move within the box with the axle during relative lateral movement between the axle and the frame and normally inoperative means for yieldingly resisting lateral movement, said means being constructed and arranged to react between the bearing and the box in offering its resistance and to urge the axle to resume its normal position after cessation of the forces which cause the lateral motion.

19. A lateral motion device for a railway vehicle axle comprising in combination, a vehicle frame, an axle box mounted in the frame so as to be restrained against relative movement between the frame and the box in a direction transverse of the vehicle, an axle bearing in the box mounted to move within the box with the axle during relative lateral movement between the axle and the frame and normally inoperative spring means carried by the box for yieldingly resisting lateral movement, said means being adapted to act through the bearing in offering its resistance and to urge the axle to resume its normal position after cessation of the forces which caused the lateral motion.

20. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, said bearing being mounted to move within the box with the axle during relative lateral movement between the axle and the frame, and normally inoperative means for yieldingly resisting lateral movement, said means being adapted to act against the outer race in offering its resistance and to urge the axle to resume its normal position after cessation of the forces which caused the lateral motion.

21. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, said bearing being mounted to move within the box with the axle during relative lateral movement between the axle and the frame, and normally inoperative means for yieldingly resisting lateral movement, said means being constructed and arranged to react between the box and the outer race in offering its resistance and to urge the axle to resume its normal position after cessation of the forces which caused the lateral motion.

22. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, said bearing being mounted to move within the box with the axle during relative lateral movement between the axle and the frame, and normally inoperative spring means carried by the box for yieldingly resisting lateral movement, said means being adapted to react between the box and the outer race in offering its resistance and to urge the axle to resume its normal position after cessation of the forces which caused the lateral motion.

23. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, one of which races moves within the box with the axle during relative lateral movement between the axle and the frame, and normally inoperative means for yieldingly resisting lateral movement, said means being adapted to act through the movable race in offering its resistance and to urge the axle to resume its normal position after cessation of the forces which caused the lateral motion.

24. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, one of which races moves within the box with the axle during relative lateral movement between the axle and the frame, and normally inoperative means for yieldingly resisting lateral movement, said means being constructed and arranged to react between the box and said movable race in offering its resistance and to urge the axle to resume its normal position after cessation of the forces which caused the lateral motion.

25. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an inner and an outer race, one of which races moves within the box with the axle during relative lateral movement between the axle and the frame, and normally inoperative spring means carried by the box for yieldingly resisting lateral movement, said means being adapted to react between the box and said movable race in offering its resistance and to urge the axle to resume its normal position after cessation of the forces which caused the lateral motion.

26. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an outer race, said bearing being mounted to move within the box with the axle during relative lateral movement between the axle and the frame, a backing shoe between the outer race and the box adapted to move with the bearing, and normally inoperative means for yieldingly resisting lateral movement, said means being adapted to act through the shoe in offering its resistance and to urge the axle to resume its normal position after cessation of the forces which caused the lateral motion.

27. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an outer race, said bearing being mounted to move within the box with the axle during relative lateral movement between the axle and the frame, a backing shoe between the outer race and the box adapted to move with the bearing, and normally inoperative means for yieldingly resisting lateral movement, said means being constructed and arranged to react between the box and the shoe in offering its resistance and to urge the axle to resume its normal position after cessation of the forces which caused the lateral motion.

28. A lateral motion device for a railway vehicle axle comprising in combination, a vehicle frame, an axle box mounted in the frame so as to be restrained against relative movement between the frame and the box in a direction transverse of the vehicle, an anti-friction bearing for the axle having an outer race, said bearing being mounted to move within the box with the axle during relative lateral movement between the axle and the frame a backing shoe between the outer race and the box adapted to move with the bearing, and normally inoperative spring means carried by the box for yieldingly resisting lateral movement, said means being adapted to react between the box and said shoe in offering its resistance and to urge the axle to resume its normal position after cessation of the forces which caused the lateral motion.

29. A lateral motion device for a railway vehicle axle comprising in combination, a vehicle frame, an axle box mounted in the frame so as to be restrained against relative movement between the frame and the box in a direction transverse of the vehicle, a self-aligning roller bearing in the box mounted to move within the box with the axle during relative lateral movement between the axle and the frame, and normally inoperative means for yieldingly resisting lateral movement, said means being adapted to act through said self-aligning bearing in offering its resistance and to urge the axle to resume its normal position after cessation of the forces which caused the lateral motion.

30. A lateral motion device for a railway vehicle axle comprising in combination, a vehicle frame, an axle box mounted in the frame so as to be restrained against relative movement between the frame and the box in a direction transverse of the vehicle, a self-aligning roller bearing in the box mounted to move within the box with the axle during relative lateral movement between the axle and the frame, and normally inoperative means for yieldingly resisting lateral movement, said means being constructed and arranged to react between the box and said self-aligning bearing in offering its resistance and to urge the axle to resume its normal position after cessation of the forces which caused the lateral motion.

31. A lateral motion device for a railway vehicle axle comprising in combination, a vehicle frame, an axle box mounted in the frame so as to be restrained against relative movement between the frame and the box in a direction transverse of the vehicle, a self-aligning roller bearing in the box mounted to move within the box with the axle during relative lateral movement between the axle and the frame, and normally inoperative spring means for yieldingly resisting lateral movement, said means being adapted to react between the box and said self-aligning bearing in offering its resistance and to urge the axle to resume its normal position after cessation of the forces which caused the lateral motion.

32. A lateral motion device for a railway vehicle axle comprising in combination, a vehicle frame, an open-topped axle box mounted in the frame so as to be restrained against relative movement between the frame and the box in a direction transverse of the vehicle, an axle bearing in said box mounted to move within the box with the axle during relative lateral movement between the axle and the frame, load transmitting means embracing the bearing and projecting through said open top and adapted to move laterally with the bearing, and means for yieldingly resisting such lateral movement, said last means acting through the load transmitting means in offering its resistance and being adapted to urge the axle to resume its normal position after cessation of the forces which caused the lateral motion.

GEORGE H. ZOUCK.